Figure 1:
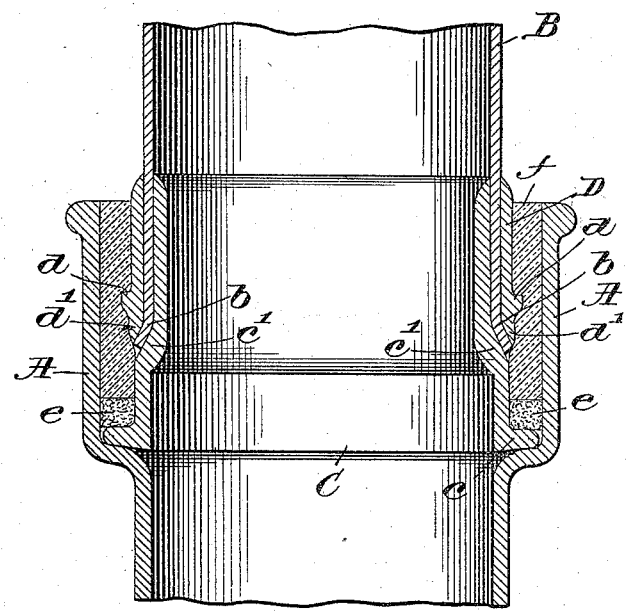

(No Model.)

C. J. LENNIHAN.
PIPE JOINT FOR PLUMBING.

No. 534,896. Patented Feb. 26, 1895.

Witnesses.
Thomas J. Drummond
A. C. Harmon

Inventor.
Charles J. Lennihan
by Crosby & Gregory
Attys.

UNITED STATES PATENT OFFICE.

CHARLES J. LENNIHAN, OF BOSTON, MASSACHUSETTS, ASSIGNOR TO HENRY HUSSEY & CO., OF SAME PLACE.

PIPE-JOINT FOR PLUMBING.

SPECIFICATION forming part of Letters Patent No. 534,896, dated February 26, 1895.

Application filed October 2, 1894. Serial No. 524,730. (No model.)

*To all whom it may concern:*

Be it known that I, CHARLES J. LENNIHAN, of Boston, county of Suffolk, State of Massachusetts, have invented an Improvement in Pipe-Joints for Plumbing and other Work, of which the following description, in connection with the accompanying drawings, is a specification, like letters on the drawings representing like parts.

This invention has for its object to provide a novel pipe joint which shall be inexpensive, and easily made by a workman.

Inasmuch as my invention is particularly adapted for use in plumbing, and especially in the connection of lead bends with soil pipes, I shall hereinafter particularly illustrate and describe my invention in connection with such use, it being understood, however, that my said invention is not restricted to such use alone.

At the present time the more general, if not the universal method of uniting a lead bend to the usual branch of a soil pipe, is to first secure a flanged brass sleeve to the end of the lead bend by means of what is commonly known as a "wipe joint." A perfect wipe joint of this size usually requires from two to three hours to make, and a large quantity of solder, which is expensive. Further than this, unless the workman is very careful the joint will be so large and bungling as to prevent proper subsequent calking, and in some instances to reduce the size of the joint, both for convenience and appearance, the workman removes a portion of the solder with his knife, and in so doing, is apt to cut through the lead bend.

To obviate these difficulties, I have devised the joint forming the subject of this application, the same consisting of a preferably flanged sleeve adapted to be inserted in the end of a lead or other pipe and provided with a circumferential taper to spread the said pipe end. Upon the exterior of the pipe I apply a collar adapted to be driven or otherwise forced against the enlarged or flaring end of the pipe and to clamp the same tightly against the taper upon the sleeve, so that a perfectly tight connection between the sleeve and pipe is formed. The end of the pipe, with its attached sleeve, is then placed in the usual socket upon the end of the soil pipe or branch, and a filling or packing material, either solder or lead, poured into the socket and about the said pipe end and sleeve, which, when afterward calked renders the joint between the lead pipe and the soil pipe absolutely tight. The interior sleeve and the exterior collar are each preferably provided with a circumferential flange or lip in order that the operation of calking may serve to drive the same more firmly into proper clamping positions.

Figure 2:
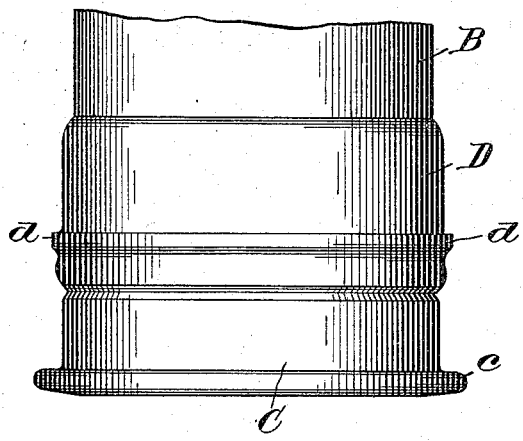

In the drawings, Figure 1 shows a joint embodying my invention in section, and Fig. 2 in elevation shows the end of the pipe, with the sleeve and collar applied thereto.

In the embodiment of my invention shown in the drawings, A represents the socket upon the end of the soil or other pipe, or upon the end of a usual branch or arm extending laterally from such pipe, it being desired to unite the end of a lead or other pipe or bend B to the said socketed pipe or arm by a perfectly tight joint. To accomplish this I first insert in the end of the pipe B a sleeve C, preferably provided with a flange $c$ adapted to seat n the bottom of the socket, and with a circumferential taper $c'$ to spread or flare the end $b$ of the pipe B. This sleeve C is preferably driven into the end of the pipe B with sufficient force to spread, somewhat at least, the end of the said pipe. An outer collar D, preferably placed upon the pipe B before the sleeve C is inserted, is now driven down upon the flared end $b$ of the pipe B to clamp the said pipe end tightly between it and the taper $c$ upon the interior sleeve C, the said outer collar being preferably provided with a circumferential lip $d$ against which a driving tool may be placed, and the end of the said collar is preferably made flaring, as at $d'$ to more nearly conform to the curvature of the flared end of the pipe B and the taper $c$. The end of the pipe B with its attached collar and sleeve are now inserted in the socket A, as shown in Fig. 1, and a filling of hemp or equivalent material $e$, is laid upon the top of the flange $c$, as shown. A filling of lead, solder, or other suitable material is now poured into the socket A and surrounding the pipe B to a level with the top of the socket, which filling is afterward calked in usual manner to form a tight joint between the pipe B and its socket.

In the operation of calking, the flanged sleeve C is driven the more tightly upon its seat at the bottom of the socket A, and the collar D, by reason of its circumferential lip *d*, is likewise driven the more tightly upon the flaring end of the pipe B and taper *c*, so that the calking operation not only packs the filling or packing *f* tightly within the socket and against the pipe B, and collar and sleeve contained therein, but also operates to wedge or clamp said pipe B more tightly between its sleeve and collar.

The sleeve and collar described are both cheaply constructed by casting from malleable iron or brass, they requiring no machine work whatsoever, and as will be seen they are easily applied to the end of the pipe or bend B and afterward calked in the socket A, so that the entire joint while as tight as it is possible to make a mechanical joint, is, nevertheless, extremely simple and cheap.

It is obvious my improved joint, with slight modifications, evident to those skilled in the art, is adapted for various uses in connection with plumbing and other work of a similar nature, and my invention is not, therefore, limited to a joint between a lead bend or pipe and a socketed soil pipe, said invention being applicable to any joint which may be formed in the manner shown and described.

I claim—

1. The combination with a sleeve adapted for insertion in the end of a pipe, said sleeve having a flange projecting laterally beyond the outside of said pipe end, and above said flange a circumferential taper to spread said pipe end, of a collar adapted to be slipped upon the exterior of said pipe and driven down upon the outside of the expanded end thereof to nip and tightly hold said expanded end between it and the tapered sleeve, substantially as described.

2. The combination with a sleeve adapted for insertion in the end of a pipe and having a circumferential taper to spread said pipe end, of a collar adapted to be driven upon the exterior of said pipe to clamp the latter upon said taper, said collar having an enlarged or retaining lip, substantially as described.

3. The herein described joint consisting of a socket, a pipe end inserted therein, a tapered sleeve inserted in and to spread the said pipe end and provided with a flange projecting laterally beyond the outside of said pipe end, a clamping collar upon the exterior of said pipe end, and a calked filling surrounding the said pipe end, within the socket, and resting against the sleeve flange outside the pipe, substantially as described.

In testimony whereof I have signed my name to this specification in the presence of two subscribing witnesses.

CHARLES J. LENNIHAN.

Witnesses:
FREDERICK L. EMERY,
M. J. SHERIDAN.